US009442659B2

(12) United States Patent
Nakagawa

(10) Patent No.: US 9,442,659 B2
(45) Date of Patent: Sep. 13, 2016

(54) DATA BACKUP STORAGE SYSTEM

(71) Applicant: HITACHI, LTD., Tokyo (JP)

(72) Inventor: Hiroshi Nakagawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 14/350,602

(22) PCT Filed: Aug. 30, 2013

(86) PCT No.: PCT/JP2013/073240

§ 371 (c)(1),
(2) Date: Apr. 9, 2014

(87) PCT Pub. No.: WO2015/029198

PCT Pub. Date: Mar. 5, 2015

(65) Prior Publication Data

US 2015/0268866 A1 Sep. 24, 2015

(51) Int. Cl.
*G06F 3/06* (2006.01)

(52) U.S. Cl.
CPC ............. *G06F 3/0608* (2013.01); *G06F 3/065* (2013.01); *G06F 3/0619* (2013.01); *G06F 3/0665* (2013.01); *G06F 3/0689* (2013.01); *G06F 2003/0692* (2013.01)

(58) Field of Classification Search
None
See application file for complete search history.

(56) References Cited

U.S. PATENT DOCUMENTS

| | | | | |
|---|---|---|---|---|
| 2005/0120058 | A1 | 6/2005 | Nishio | |
| 2010/0082900 | A1 | 4/2010 | Murayama et al. | |
| 2011/0283063 | A1* | 11/2011 | Takiyanagi | G06F 3/0625 711/114 |
| 2011/0295809 | A1* | 12/2011 | Tatebe | G06F 11/1456 707/640 |
| 2012/0221611 | A1 | 8/2012 | Watanabe et al. | |

FOREIGN PATENT DOCUMENTS

| | | |
|---|---|---|
| JP | 2005-165486 A | 6/2005 |
| JP | 2010-086424 A | 4/2010 |
| JP | 2011-128852 A | 6/2011 |

* cited by examiner

*Primary Examiner* — Reginald Bragdon
*Assistant Examiner* — Edward Wang
(74) *Attorney, Agent, or Firm* — Volpe and Koenig, P.C.

(57) ABSTRACT

The invention provides a storage subsystem in which a system administrator and a user can accurately comprehend the used storage capacity. Therefore, according to the backup of the present invention, a process for adding new data and a process for updating already existing data are distinguished, and a management to increase a capacity used by the user is performed only when adding new data.

9 Claims, 11 Drawing Sheets

| 501 VOL Group | 502 PRIMARY VOL ID | 503 USED CAPACITY (GB) | 504 INCRE-MENTED CAPACITY (GB) | 505 RELEASED CAPACITY (GB) | 506 UPDATED CAPACITY (GB) | 507 MEASURE-MENT START TIME | 508 SCHEDULED MEASURE-MENT END TIME | 509 NUMBER OF SECONDARY VOL | 510 ENTRY NUMBER FOR SECONDARY VOL | 511 PREVIOUSLY DEFINED INFORMATION |
|---|---|---|---|---|---|---|---|---|---|---|
| VG01 | VLU0 | 28.9 | 1.1 | 0.0 | 5.7 | 13/06/12 00:00:00 | 13/06/13 00:00:00 | 2 | P001 | |
| VG01 | VLU1 | 14.3 | 0.5 | 0.2 | 1.5 | 13/06/12 00:00:00 | 13/06/13 00:00:00 | 1 | P002 | |
| : | : | | : | | | : | : | : | | |
| VGxx | VFSxx | 123.4 | 0.5 | 0.2 | 1.5 | 13/06/11 08:00:00 | 13/06/13 08:00:00 | 0 | - | |
| : | : | | : | | | : | : | : | | |

| 601 ENTRY NUMBER | 602 SECOND-ARY VOL TYPE | 603 SECOND-ARY VOL ID | 604 USED CAPACITY (GB) | 605 INCRE-MENTED CAPACITY (GB) | 606 RELEASED CAPACITY (GB) | 607 UPDATED CAPACITY (GB) | 608 NOT YET WRITTEN INCRE-MENTED CAPACITY (GB) | 609 NOT YET WRITTEN RELEASED CAPACITY (GB) | 610 NOT YET WRITTEN UPDATED CAPACITY (GB) | 611 SCHEDULED UPCOMING WRITE TIME | 612 PREVIOUSLY DEFINED INFORMATION |
|---|---|---|---|---|---|---|---|---|---|---|---|
| P001 | INTERNAL | VS00 | 28.9 | 1.1 | 0.0 | 5.7 | 0 | 0 | 0 | N/A | |
| | EXTERNAL | DF800 LUN0 | 28.3 | 0.5 | 0.0 | 3.2 | 0.6 | 0 | 2.5 | 13/06/12 20:00:00 | |
| P002 | INTERNAL | VS01 | 14.3 | 0.5 | 0.2 | 1.5 | 0 | 0 | 0 | N/A | |
| | : | : | | : | | | | | | | |

| MEASUREMENT TIME (701) | FOR PRIMARY VOL (702) | | | | INTERNAL COPY FOR SECONDARY VOL (SUM OF SECONDARY VOLS) (703) | | | INTER-SUBSYSTEM COPY FOR SECONDARY VOL (SUM OF SECONDARY VOLS) (704) | | |
|---|---|---|---|---|---|---|---|---|---|---|
| | USED CAPACITY (GB) | INCREMENTED CAPACITY (GB) | RELEASED CAPACITY (GB) | UPDATED CAPACITY (GB) | USED CAPACITY (GB) | VARIED CAPACITY (GB) | UPDATED CAPACITY (GB) | USED CAPACITY (GB) | VARIED CAPACITY (GB) | UPDATED CAPACITY (GB) |
| 13/06/11 00:00:00 | 25.9 | 3.1 | 0.0 | 7.7 | 25.9 | 3.1 | 7.7 | 25.1 | 2.6 | 6.6 |
| 13/06/12 00:00:00 | 27.8 | 2.4 | 0.5 | 5.5 | 27.8 | 1.9 | 5.5 | 27.2 | 2.1 | 6.2 |
| 13/06/13 00:00:00 | 30.5 | 2.8 | 0.1 | 6.8 | 30.5 | 2.7 | 6.8 | 29.2 | 2.0 | 6.0 |
| : | | : | | | | : | | | : | |

DATA BACKUP STORAGE SYSTEM

TECHNICAL FIELD

The present invention relates to an art for precisely comprehending a storage capacity actually used in a storage system.

BACKGROUND ART

Currently, along with the advancement and spreading of cloud technology, the environment of use of IT platform is advanced from a conventional system in which a user comprehends the status of use and constructs the system environment to a case outsourcing the system including the construction of the environment of use to external venders (adopting of a cloud system). On the other hand, along with the rapid increase of electronic data handled in businesses and in personal life in a so-called information society, the enlargement of storage capacity and the increase in scale of the information system accompanying the same has caused a drawback such as complex operation due to the complication of the backup environment.

Therefore, in order to release the users from the complication of system management, the adoption and enhancement of outsourcing of information systems using a cloud system is adopted and enhanced. On the other hand, the tendency to emphasize the used data capacity that occupies a large portion of the costs is increasing at the user side or the cloud provider side. Further, there is a need in the cloud provider side to precisely comprehend the storage capacity being actually used including the allocated storage capacity and the backup capacity in a storage system recognized by the OS of the server, from the viewpoint of appropriation of system allocation costs.

In other words, storage capacity has rapidly increased by the advancement of cloud technology, and along therewith, there are expanding needs for performing backup of the storage subsystem. Therefore, in order to operate the backup processing, it is important to comprehend the amount of actually used storage capacity per user, from the viewpoint of system operation, maintenance and planning.

Patent literature 1 discloses an art related to the above-described technique, teaching a method for managing data in a storage system performing backup.

CITATION LIST

Patent Literature

[PTL 1] Japanese Patent Application Laid-Open Publication No. 2005-165486

SUMMARY OF INVENTION

Technical Problem

In a conventional backup method, there are two types of processes, a process for adding new data and a process for updating existing data. However, according to the backup processing disclosed in patent literature 1, these two processes are not distinguished.

From the viewpoint of the user, the process for adding new data is a process that increases the used capacity in a storage device. On the other hand, the process for updating already existing data does not cause increase of the storage capacity being used, since only the contents of the existing data is updated.

Therefore, in a prior art technique that does not distinguish the two processes, there was a drawback that the management of the storage capacity being used was insufficient and that an accurate storage capacity being used by a user could not be comprehended.

Solution to Problem

In order to solve the above drawback, in the backup process of the present invention, the process for adding new data and the process for updating already existing data are distinguished, and only when adding new data, management is performed to increase the used capacity that the user uses. Thus, the system administrator or the user can comprehend the used storage capacity accurately.

Advantageous Effects of Invention

The present invention enables to realize the effect of facilitating planning fitting realities when enhancing or expanding the storage system, and enabling charging to be performed based on accurate status of use when meter rate charging is adopted. The problems, configurations and effects other than those described above will become apparent from the following description of preferred embodiments.

BRIEF DESCRIPTION OF DRAWINGS

FIG. 5 is a view illustrating a configuration example of a varied capacity management table for a primary VOL according to the present invention.

FIG. 6 is a view illustrating a configuration example of a varied capacity management table for secondary VOL according to the present invention.

FIG. 7 is a view illustrating a configuration example of a capacity management table according to the present invention.

DESCRIPTION OF EMBODIMENTS

Figure 1:
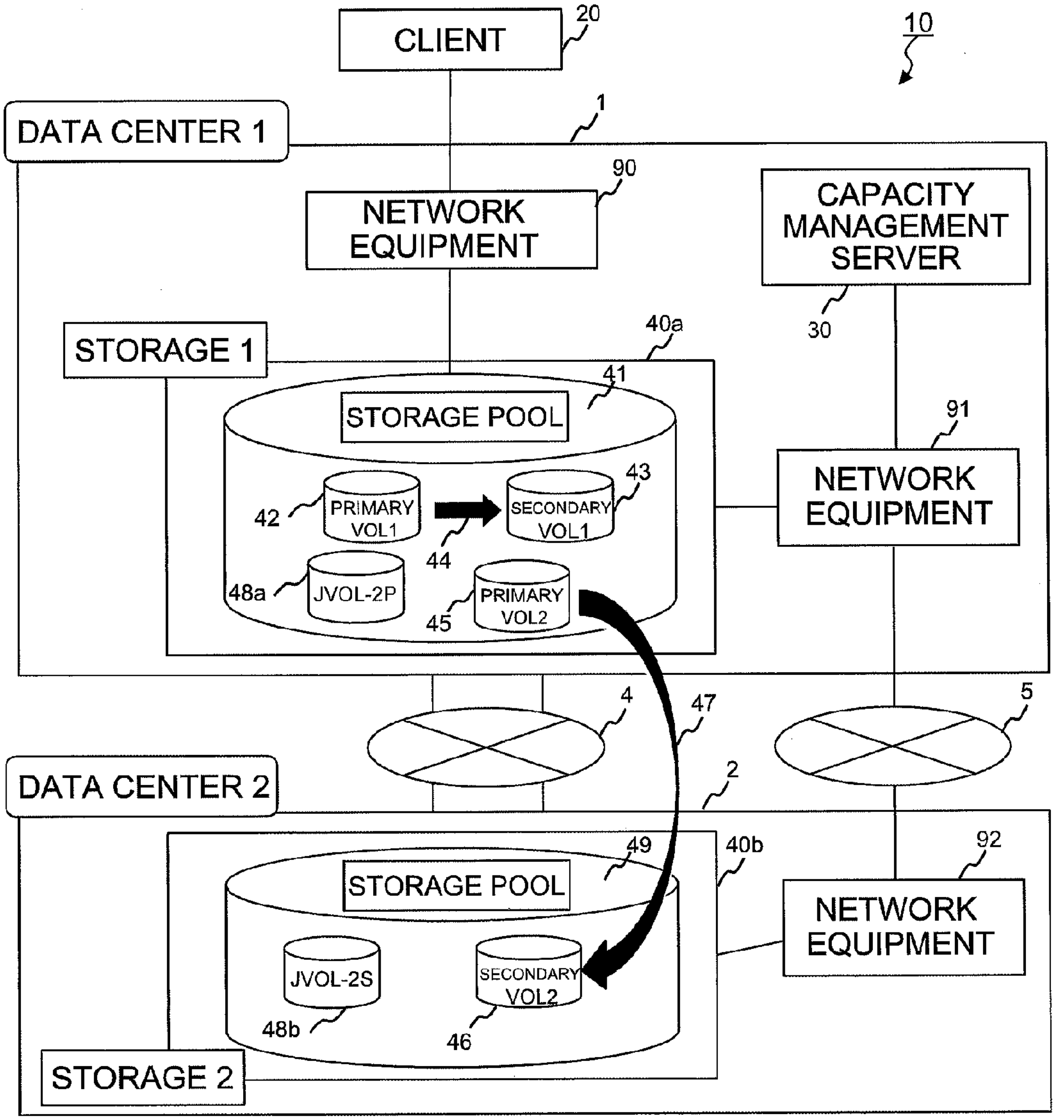
FIG. 1 illustrates a physical configuration of a storage system composed of storage subsystems according to the present invention.

Now, the preferred embodiments of the present invention will be described with reference to the drawings. In the following description, various information may be referred to as "management tables", for example, but the various information can also be expressed by data structures other than tables. Further, the "management table" can also be referred to as "management information" to indicate that the information does not depend on the data structure.

The processes are sometimes described using the term "program" as the subject. The program is executed by a processor such as an MP (Micro Processor) or a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element, such as each controller, can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical scope of the present invention. The number of each component can be one or more than one unless defined otherwise.

<<System Configuration>>

<Overall Configuration of Storage System>

FIG. 1 is a view illustrating a physical configuration example of a storage system composed of a storage subsystem according to the present invention. A storage system 10 is composed of a system within a data center 1 coupled to a client terminal 20, and a system within a data center 2.

A data center 1 includes a capacity management server 30, a network equipment 90, a network equipment 91, and devices and systems of a storage subsystem 40*a* coupled to the client terminal 20. A data center 2 includes a network equipment 92, and devices and systems of a storage subsystem 40*b*.

The client terminal 20 is a computer coupled to the storage subsystem 40*a* via the network equipment 90, for writing data to the storage subsystem 40*a* and reading data from the storage subsystem 40*a*. The client terminal 20 includes, for example, a host computer, a server, a PC (Personal Computer), a multifunctional mobile terminal and the like.

The capacity management server 30 is a server for managing storage capacities used by the respective storage subsystems, wherein the used capacity of the respective volumes is managed for each storage subsystem using a capacity management table (described later).

The storage subsystem 40*a* manages a storage area composed of multiple storage devices (HDDs (Hard Disk Drives) and SSDs (Solid State Drives)) as a storage pool 41, and when the storage area is used as a volume, a storage area having a given storage capacity is allocated from the storage pool 41.

Similarly, the storage subsystem 40*b* of the data center 2 has a storage pool 49. A dedicated inter-center coupling network 4 is coupled between the storage subsystem 40*a* and the storage subsystem 40*b*, and data copy can be performed in a remote manner between storage subsystems (inter-subsystem). Further, the capacity management server 30 and the storage subsystem 40*a* or the storage subsystem 40*b* are coupled via a network equipment 91, a network 5, and a network equipment 92. Sometimes, the storage subsystem 40*a* and the storage subsystem 40*b* are collectively called the storage subsystem 40. As described, in order to backup data reliably and efficiently to a remote location, the data center 1 and the data center 2 are coupled via a dedicated line, and backup is executed during operation using a remote copy function.

Further, the storage subsystem 40 creates a primary volume (primary VOL) or a secondary volume (secondary VOL) collectively including storage areas allocated from storage pools and having a given storage capacity. FIG. 1 shows a secondary VOL1 43 forming a pair with a primary VOL1 42 in the storage subsystem 40*a*, and a primary VOL2 45 forming a pair with the secondary VOL2 46 in the storage subsystem 40*b*. Further, the contents of the primary VOL1 42 are copied to the secondary VOL1 43 (reference number 44), so that redundancy is achieved and data is backed up.

Similarly, the contents of the primary VOL2 45 are copied to the secondary VOL2 46 (reference number 47), so that redundancy is achieved and data is backed up. The copying method can adopt either a synchronous copy in which the update performed in the primary VOL is immediately reflected in the secondary VOL, or an asynchronous copy in which the update is reflected after the elapse of a given time. In the asynchronous copy, a difference data or not yet written data is managed via a journal (JNL) volume (JVOL). They are referred to as JVOL-2P 48*a* and JVOL-2S 48*b*. The JVOL-2P 48*a* is a journal volume for the primary VOL2 45, and JVOL-2S 48*b* is a journal volume for the secondary VOL2 46.

In the present invention, the information of a used storage capacity (hereinafter referred to as used capacity), an incremented storage capacity (hereinafter referred to as incremented capacity), a released storage capacity (hereinafter referred to as released capacity) and an updated storage capacity (hereinafter referred to as updated capacity) in each primary VOL and each secondary VOL and not yet written capacity (incremented/released/updated) in each secondary VOL are managed in the respective storage subsystems, and the information is acquired by the capacity management server 30 performing uniform management of the whole system, so that the storage capacity actually used by each storage subsystem can be comprehended.

<Internal Configuration of Client Terminal>

Figure 2:
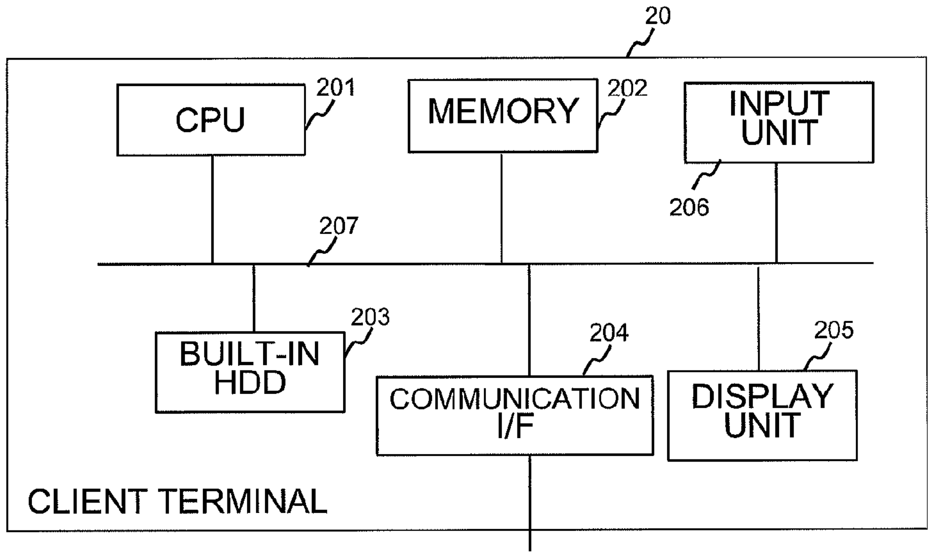
FIG. 2 is a block diagram illustrating a configuration example of hardware of a client terminal.

FIG. 2 is a block diagram illustrating a configuration example of hardware of a client terminal. The client terminal 20 comprises a CPU 201 for executing programs stored in a memory 202, a memory 202 for storing programs and data, a built-in HDD 203 for storing various programs and data, a communication interface (hereinafter referred to as communication I/F) 204 for coupling with the storage subsystem 40*a* via the network equipment 90, a display unit 205 (such as a liquid crystal display) for displaying information such as device configuration and operation status, and an input unit 206 (such as a keyboard) for receiving data and commands from a user, wherein these components are mutually coupled via a system bus 207.

<Internal Configuration of Capacity Management Server>

Figure 3:
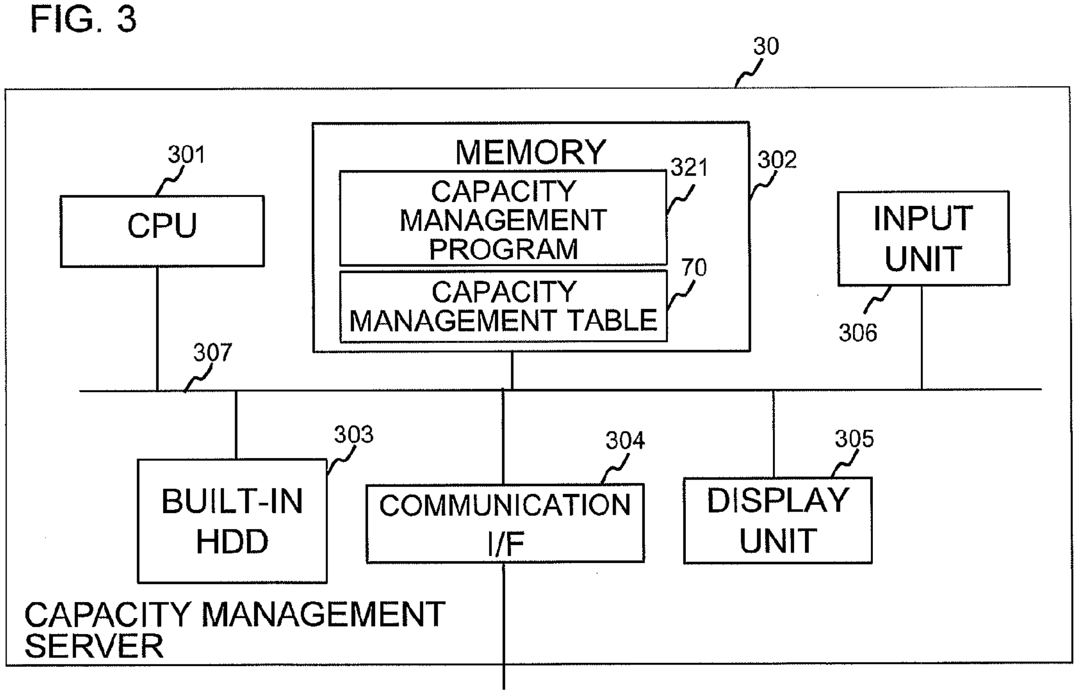
FIG. 3 is a block diagram illustrating a configuration example of hardware and software of a capacity management server according to the present invention.

FIG. 3 is a block diagram illustrating a configuration example of a hardware and a software of a capacity management server according to the present invention. The capacity management server 30 is a server for performing uniform management of the storage capacity of each storage system, which includes a CPU 301 for executing programs stored in a memory 302, a memory 302 for storing programs, data and tables, a built-in HDD 303 for storing various programs and data, a communication I/F 304 for coupling with the storage subsystems 40*a* and 40*b* via the network equipment 91 and 92, a display unit 305 (such as a liquid crystal display) for displaying information such as device configuration and operation status, and an input unit 306 (such as a keyboard) for receiving data and commands from a user, wherein these components are mutually coupled via a system bus 307.

The memory 302 stores a capacity management program 321 and a capacity management table 70. The capacity management program 321 is equipped with a function to transmit a request to report variation of storage capacity to the various storage subsystems and acquire the respective capacity data, a function to update and manage the capacity management table 70, and a function to display the respective capacity data on the display unit 305. The capacity management table 70 is a table created for each primary VOL, for managing the capacity data per measurement time of the primary VOL and a secondary VOL forming a pair with the primary VOL.

<Internal Configuration of Storage Subsystem>

Figure 4:
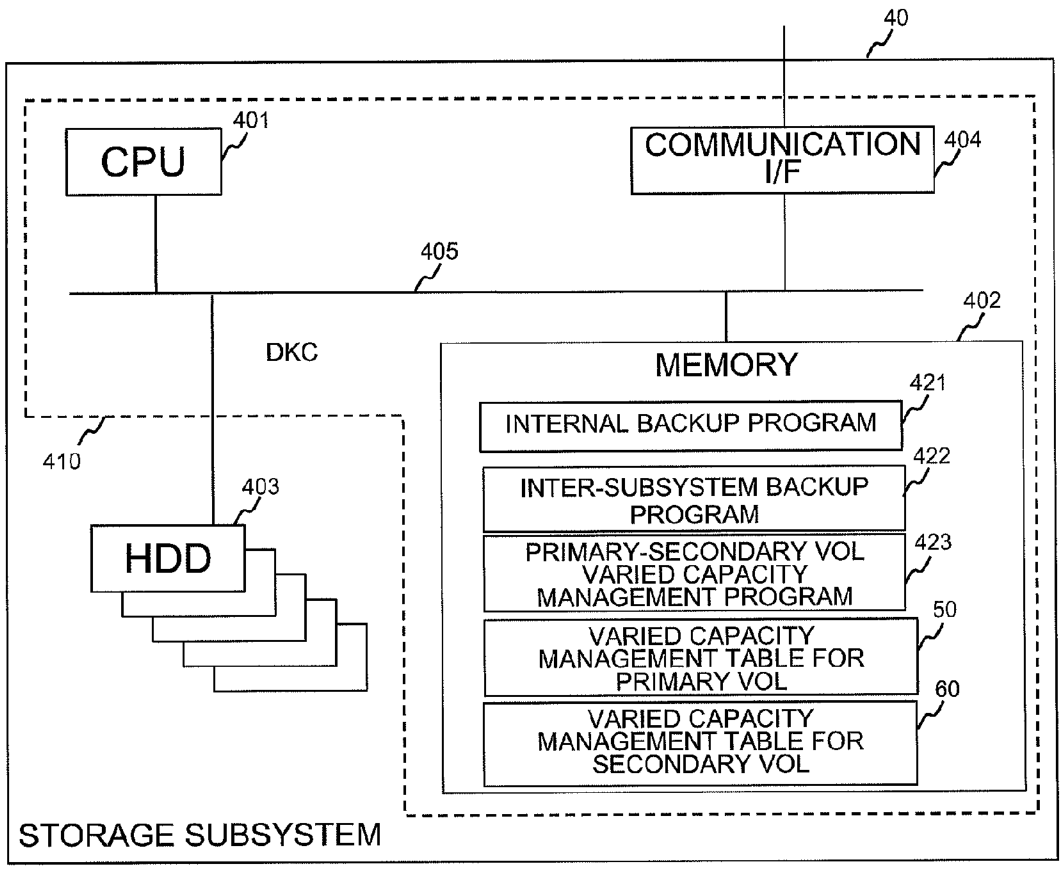
FIG. 4 is a block diagram illustrating a configuration example of hardware and software of a storage subsystem according to the present invention.

FIG. 4 is a block diagram illustrating a configuration example of a hardware and a software of a storage subsystem according to the present invention. A storage subsystem 40 includes a CPU 401 for executing programs stored in a memory 402, a memory 402 for storing programs and data, multiple HDDs 403 for storing various programs and data, and a communication I/F 404 for coupling to the storage subsystem 40*a* via the network equipment 91, wherein these components are mutually coupled via a system bus 405.

The memory 402 stores an internal backup program 421, an inter-subsystem backup program 422, a primary-secondary VOL varied capacity management program 422, a varied capacity management table 50 for primary VOL, and a varied capacity management table 60 for secondary VOL.

An internal backup program 421 is a program for executing data copy between a primary VOL (such as a primary VOL2 45) and a secondary VOL (such as a secondary VOL2 46) within the same storage subsystem, and for performing backup of the data within the primary VOL to the secondary VOL. For example, an internal backup program 421 is a program for copying the data in the primary VOL1 42 to the secondary VOL1 43 (reference number 44) as in FIG. 1 to perform backup of data.

An inter-subsystem backup program 422 is a program for executing data copy between a primary VOL and a secondary VOL which are located in different storage subsystems, and to perform backup of data in the primary VOL to the secondary VOL. In other words, the present program is for copying the data in the primary VOL2 45 to the secondary VOL2 46 (reference number 47) as in FIG. 1 to perform backup of data.

A primary-secondary VOL varied capacity management program 423 is a program for managing the respective capacities of the primary VOL and the secondary VOL (used/incremented/released/updated, not yet written capacity (capacity that is not yet written to the secondary VOL)) and the measurement time information.

A varied capacity management table 50 for primary VOL and a varied capacity management table 60 for secondary VOL are tables for managing the storage capacity information for the primary VOL and the secondary VOL, respectively. These tables will be described in detail later.

<<Management Table>>

<Varied Capacity Management Table for Primary VOL>

FIG. 5 is a configuration example of a varied capacity management table for a primary VOL according to the present invention. The varied capacity management table 50 for primary VOL is a table for managing the volume information of the respective primary VOLs, and includes a volume group (VOL Group) 501, a primary VOL ID 502, a used capacity 503, an incremented capacity 504, a released capacity 505, an updated capacity 506, a measurement start time 507, a scheduled measurement end time 508, a number of secondary VOLs 509, an entry number for secondary VOLs 510, and a previously defined information 511.

The volume group 501 is information for uniquely identifying the group to which a primary VOL belongs. The primary VOL ID 502 is information for uniquely identifying a primary VOL.

The used capacity 503 is the actual storage capacity being used by the primary VOL. The incremented capacity 504 is a capacity corresponding to a newly allocated and used storage area from when the previous measurement was completed. The released capacity 505 is a capacity corresponding to a newly deleted and released storage area from when the previous measurement was completed. The updated capacity 506 is a capacity having been updated to data stored in an already allocated storage area. The used capacity 503, the incremented capacity 504, the released capacity 505 and the updated capacity 506 are updated by having data written from the client terminal 20.

The measurement start time 507 and the scheduled measurement end time 508 store the start time and the scheduled measurement end time of measurement of the used capacity 503, the incremented capacity 504, the released capacity 505 and the updated capacity 506. Further, the measurement time according to the present embodiment is one or two days, but it can also be weeks or of hours.

The number of secondary VOLs 509 shows the number of secondary VOLs forming a pair with primary VOLs. The secondary VOL forming a pair with the primary VOL can be recognized by verifying the entry number of the secondary VOL 510 with the entry number 610 in the varied capacity management table 60 for the secondary VOL. It is possible to store the respective secondary VOL IDs of the secondary VOLs forming pairs to the entry number 510 for the secondary VOL, so that the correspondence between the primary VOL and the secondary VOL can be recognized directly.

The previously defined information 511 stores the used capacity 503, the incremented capacity 504, the released capacity 505, the updated capacity 506, the measurement start time 507 and the scheduled measurement end time 508 at the point of time when the previous scheduled measurement end time has been reached. The capacity management server 30 acquires the information stored in the previously defined information 511 periodically or at a point of time when an instruction is received from a system administrator/user. In another example, it is possible to have an accumulated value (definite value) of each capacity stored in the previously defined information 511 at the point of time when an instruction of an information acquisition instruction from the capacity management server 30 is received, based on an information acquisition order from the capacity management server. Further, simultaneously as when the accumulated value of the varied capacity is stored in the previously defined information 511, the entry data of the incremented/released/updated capacity are cleared.

<Varied Capacity Management Table for Secondary VOL>

FIG. 6 illustrates a configuration example of a varied capacity management table for secondary VOL according to the present invention. The varied capacity management table 60 for secondary VOL includes an entry number 601, a secondary VOL type 602, a secondary VOL ID 603, a used capacity 604, an incremented capacity 605, a released capacity 606, an updated capacity 607, a not-yet-written incremented capacity 608, a not-yet-written released capacity 609, a not-yet-written updated capacity 610, a scheduled upcoming write time 611, and a previously defined information 612.

The entry number 601 is information for uniquely identifying a primary VOL forming a pair with the secondary VOL. The secondary VOL type 602 is information indicating whether the secondary VOL exists within a storage subsystem to which the primary VOL forming a pair therewith belongs or exists outside said storage subsystem, wherein if the secondary VOL exists within the same storage subsystem, "internal" is stored in the table, and if the secondary VOL exists outside the storage subsystem, "external" or "inter-subsystem" is stored in the table. Based on this information, the data copy destination during backup of data is identified. The secondary VOL ID 603 is information for uniquely identifying a secondary VOL, wherein if the secondary VOL is located internally, the name of the volume is stored, and if the secondary VOL is located outside the subsystem, the name of the storage subsystem and the volume name are stored.

The used capacity 604, the incremented capacity 605, the released capacity 606 and the updated capacity 607 are the same as FIG. 5, but during asynchronous copying of data from the primary VOL to the secondary VOL, the respective capacities reflected in the secondary VOL are stored.

The not-yet-written incremented capacity 608, the not-yet-written released capacity 609 and the not-yet-written updated capacity 610 store the respective capacities not yet written in the secondary VOL during asynchronous copying of data from the primary VOL to the secondary VOL.

For example, in the case of a copy pair where the primary VOL has a primary VOL ID 502 of "VLU0" and the secondary VOL has a secondary VOL ID 603 of "VS00", synchronous copy is executed, so that the content of variation in the primary VOL side is immediately reflected in the secondary VOL side. In the case of a copy pair with a secondary VOL having a secondary VOL ID 603 of "DF800 LUN0", since asynchronous copy is executed, the content of variation in the primary VOL side is not immediately reflected in the secondary VOL side, and the capacities of not yet written contents are stored in the not-yet-written incremented capacity 608, the not-yet-written released capacity 609, and the not-yet-written updated capacity 610.

For example, since the second row of the varied capacity management table 60 for secondary VOL corresponds to inter-subsystem copy (asynchronous copy), the capacity is added respectively to the not yet written capacity until the copy is executed, and thereafter, the capacity having been subjected to inter-subsystem copy is added to the respective capacities as already written capacity, and the not yet written capacity is subtracted. When the inter-subsystem copy is completed, the not yet written capacity is cleared to 0.

The scheduled upcoming write time 611 is a scheduled time for writing the not yet written data to the secondary VOL. The scheduled time is stored in the case of asynchronous copy, but it will not be stored in the ease of synchronous copy.

Moreover, the previously defined information 612 stores the used capacity 604, the incremented capacity 605, the released capacity 606 and the updated capacity 607 at the point of time of the previous scheduled measurement end time has been reached. The capacity management server 30 acquires the information stored in the previously defined information 612 either periodically or when an instruction from a user has been received. In another example, it is possible to store the accumulated value (definite value) at the point of time an instruction to acquire information from the capacity management server 30 has been received in the previously defined information 612.

Further, in the case of a secondary VOL forming a pair with the primary VOL by synchronous copy, simultaneously as when the accumulated value of the varied capacity is stored in the previously defined information 612, the data in the entries of incremented/released/updated capacity are cleared.

Further, in the case of an internal copy (synchronous copy) where data is immediately written to the secondary VOL, it is possible to use the data of the primary VOL, so that the varied capacity management table 60 for secondary VOL can be used as a table dedicated to inter-subsystem copy.

The incremented capacity measurement that the present embodiment assumes is executed based on the measurement time set up in the varied capacity management table 50 for primary VOL, so that there is no entry corresponding to a time stamp in the varied capacity management table 60 for secondary VOL. However, the present invention is not restricted to such example, and it is possible to provide an independent entry (measurement start time and scheduled measurement end time) in the varied capacity management table 60 for secondary VOL, and comparing and verifying the contents of the varied capacity management table 50 for primary VOL and the contents of the varied capacity management table 60 for secondary VOL, so as to guarantee the reliability of the stored data.

<Capacity Management Table>

FIG. 7 is a view showing a configuration example of a capacity management table according to the present invention. A capacity management table 70 is a table for managing the respective capacities of a primary VOL/internally-copied secondary VOL/inter-subsystem copied secondary VOL in the storage subsystem coupled to the capacity management server 30 together with the measurement time information, and calculating the actual used capacity, wherein the table is created for each primary VOL to perform capacity management thereof. FIG. 7 illustrates an example of a primary VOL where the VOL group 501 is "VG01" and the primary VOL ID 502 is "VLU0".

The capacity management table 70 includes a measurement time 701, a capacity storage entry 702 for primary VOL, a capacity storage entry 703 for secondary VOL subjected to internal copy, and a capacity storage entry 704 for secondary VOL subjected to inter-subsystem copy, but an additional column for entering an acquisition time in which the time of acquisition of capacity data from the respective storage subsystems can be provided.

The measurement time 701 is a time stamp of the defined time of varied capacity of the storage subsystem. The measurement time 701 can store the time of reception of the request for reporting varied capacity from the capacity management server 30 described later, or can store the time of reception of the request for acquiring varied capacity from the client terminal 20.

The capacity storage entry 702 for primary VOL includes respective entries corresponding to the used capacity (GB), the incremented capacity (GB), the released capacity (GB) and the updated capacity (GB).

The capacity storage entry 703 for secondary VOL subjected to internal copy also includes entries corresponding to the used capacity (GB), the varied capacity (GB) and the updated capacity (GB), but it does not include entries corresponding to the incremented capacity and the released capacity.

The capacity storage entry 704 for secondary VOL subjected to inter-subsystem copy includes entries corresponding to the used capacity (GB), the varied capacity (GB) and the updated capacity (GB), but it does not include entries corresponding to the incremented capacity and the released capacity.

The used/incremented/released/updated capacities of the capacity storage entry 702 for primary VOL are the same as those of the storage subsystem. However, the varied capacity in the capacity storage entry 703 for secondary VOL subjected to internal copy and the capacity storage entry 704 for secondary VOL subjected to inter-subsystem copy is a combined value of incremented capacity and released capacity.

Further, combined values are stored for all the secondary VOLs subjected to internal copy and the secondary VOLs subjected to inter-subsystem copy forming pairs with primary VOLs.

Operations/Processes

Embodiment 1

Overall Processing

Figure 8:
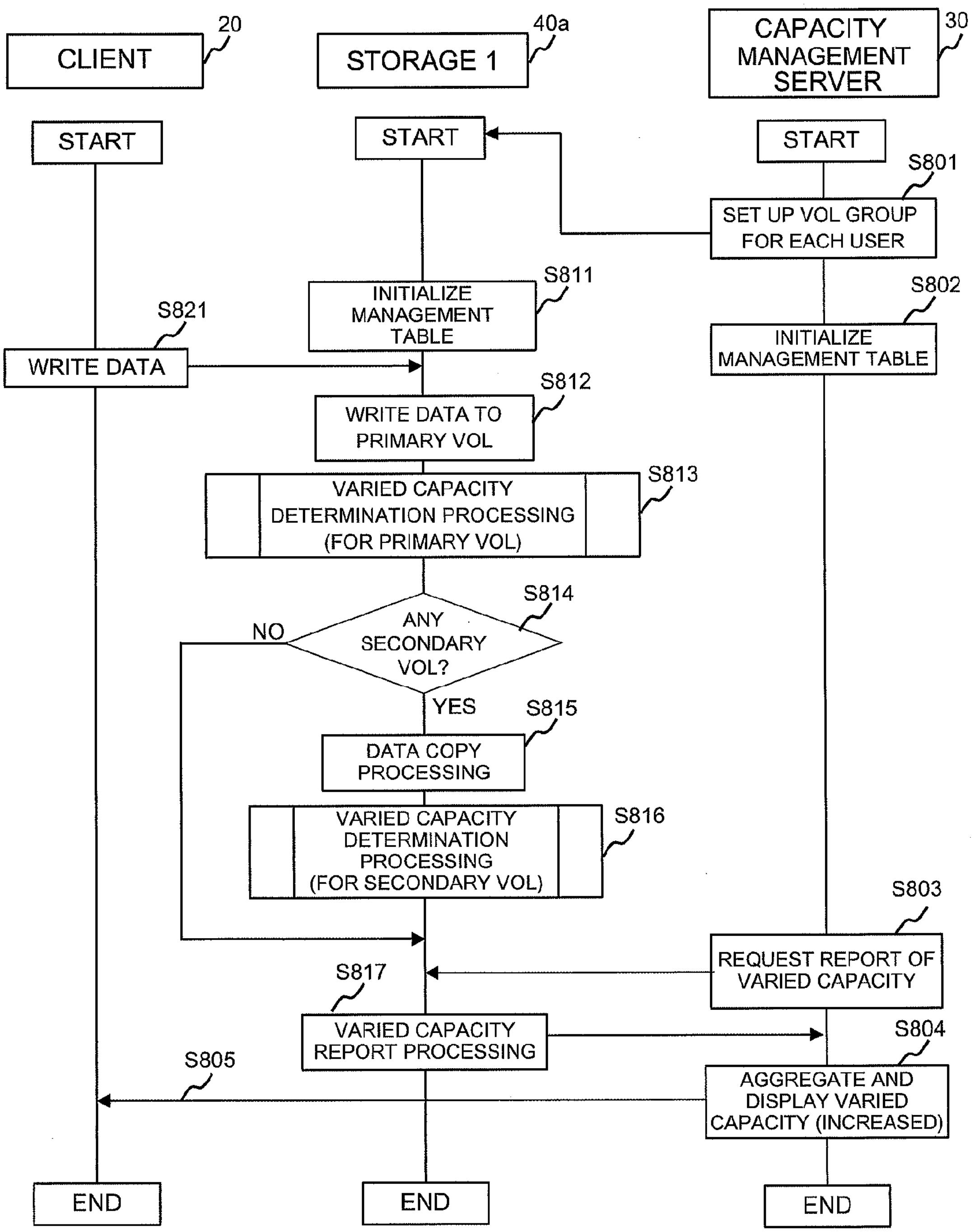
FIG. 8 is a flowchart illustrating an overall processing of varied capacity management according to a first preferred embodiment of the present invention.

FIG. 8 is a flowchart illustrating an overall processing of varied capacity management according to a first preferred embodiment of the present invention. The subjects of the processes are the respective programs in the capacity management server 30 or the storage subsystem 40, but the respective CPUs in which the programs run can also be the subjects.

In S801, the capacity management server 30 sets up a VOL group for each user, and creates a primary VOL. At the same time, the capacity management server 30 requests the storage subsystem 40*a* to initialize the varied capacity management table 50 for primary VOL and the varied capacity management table 60 for secondary VOL.

In S802, the capacity management program 307 of the capacity management server 30 initializes the capacity management table 70.

In S811, a primary-secondary VOL varied capacity management program 423 of the storage subsystem 40*a* initializes the varied capacity management table 50 for primary VOL and the varied capacity management table 60 for secondary VOL. At first, the primary-secondary VOL varied capacity management program 423 sets up the contents of the entries required in the varied capacity management table 50 for primary VOL, and deletes the contents of capacity and time. In other words, the program sets up the contents of the VOL group 501, the primary VOL ID 502, the number of secondary VOLs 509, and the entry number 510 of secondary VOL, and deletes the capacity data in reference numbers 503 through 506, the time data of reference numbers 507 and 508, and the content of the previously defined information of reference number 511.

For example, in the first row of the varied capacity management table 50 for primary VOL illustrated in FIG. 5, "VG01" is set in the VOL group 501, "VLU0" is set in the primary VOL ID 502, "2" is set in the number of secondary VOLs 509, and "P001" is set in the entry number 510 for secondary VOL. Further, "0" is set to the respective capacities, and "NULL" is set in the time information 507/508 and the previously defined information 511.

The varied capacity management table 60 for secondary VOL is formed similarly, wherein the primary-secondary VOL varied capacity management program 423 sets up given contents in the entry number 601, the secondary VOL type 602 and the secondary VOL ID 603, and deletes the contents from the used capacity 604 to the previously defined information 612. It is also possible to store an initial allocation capacity from the storage pool to a virtual VOL (primary VOL) in the entry of the used capacity and to clear the data stored in the incremented/released/updated capacity to zero in the initialization processing of the management table.

In S821, the client terminal 20 sends a data write request to the storage subsystem 40*a*.

In S812, the storage subsystem 40*a* executes a data write process to the primary VOL.

Figure 9:
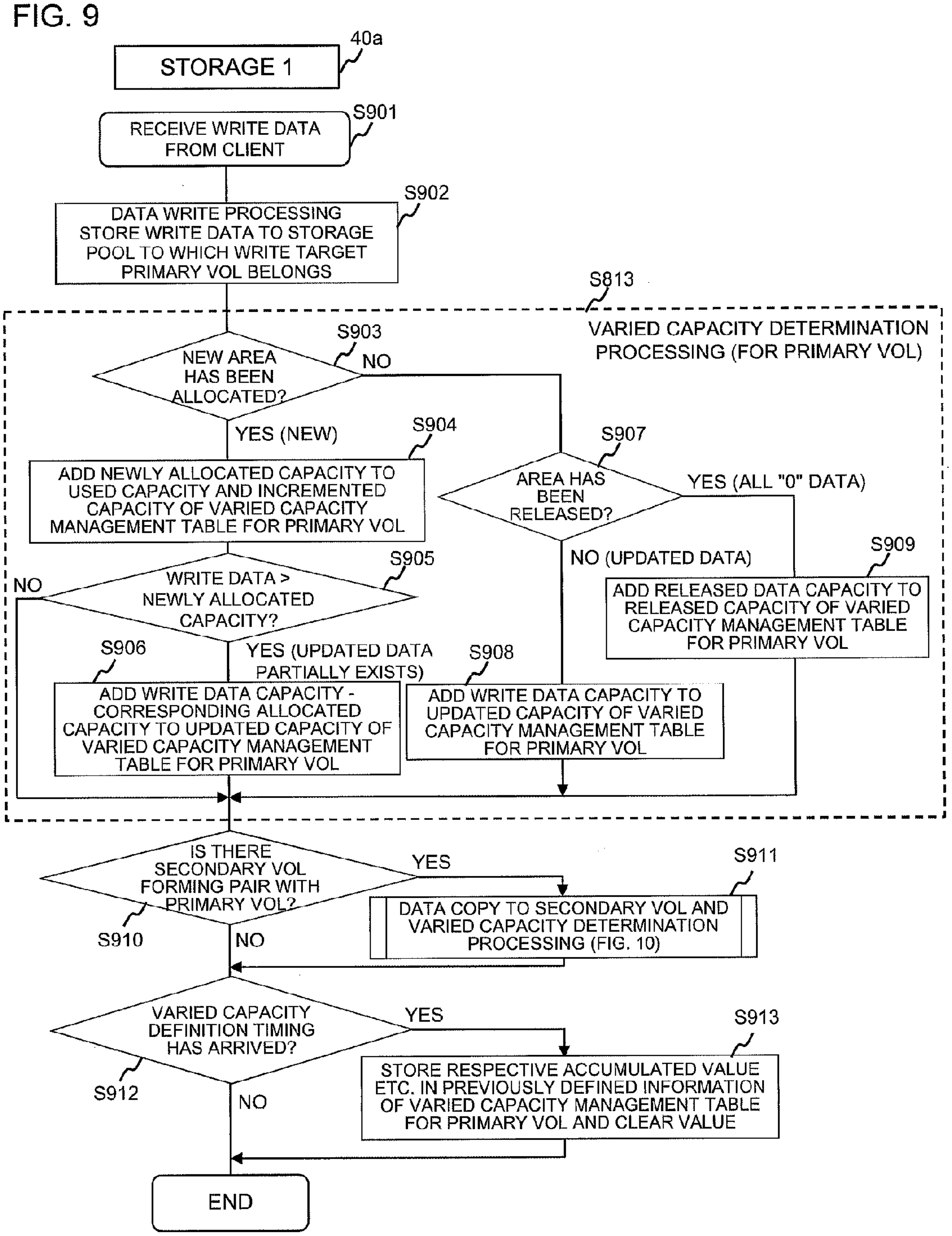
FIG. 9 is a flowchart illustrating a process for managing varied capacity in a primary VOL according to the present invention.

In S813, the primary-secondary VOL varied capacity management program 423 executes a varied capacity determination processing for primary VOL illustrated in FIG. 9. The varied capacity management table 50 for primary VOL is updated in this varied capacity determination processing for primary VOL, and the varied capacity occurring in the primary VOL can be comprehended. The details of this processing will be described with reference to FIG. 9.

In S814, the primary-secondary VOL varied capacity management program 423 refers to the number of secondary VOLs 509 in the varied capacity management table 50 for primary VOL to determine whether a secondary VOL exists for the primary VOL to which data has been written. If the value stored in the number of secondary VOLs 509 is 0 (S814: No), the primary-secondary VOL varied capacity management program 423 determines that it does not have a secondary VOL, and executes S817.

If the value stored in the number of secondary VOLs 509 is not 0 (S814: Yes), the primary-secondary VOL varied capacity management program 423 determines that a secondary VOL exists, and then, the program refers to the entry number 510 for secondary VOL so as to specify the secondary VOL to which data should be copied. The primary-secondary VOL varied capacity management program 423 causes the internal backup program 421 or the inter-subsystem backup program 422 to execute a data copy processing (S815) based on the acquired secondary VOL information.

In S815, the internal backup program 421 or the inter-subsystem backup program 422 executes a data copy processing to the secondary VOL. Based on the progress of the data copy processing, the primary-secondary VOL varied capacity management program 423 updates the varied capacity management table 60 for secondary VOL.

Figure 10:
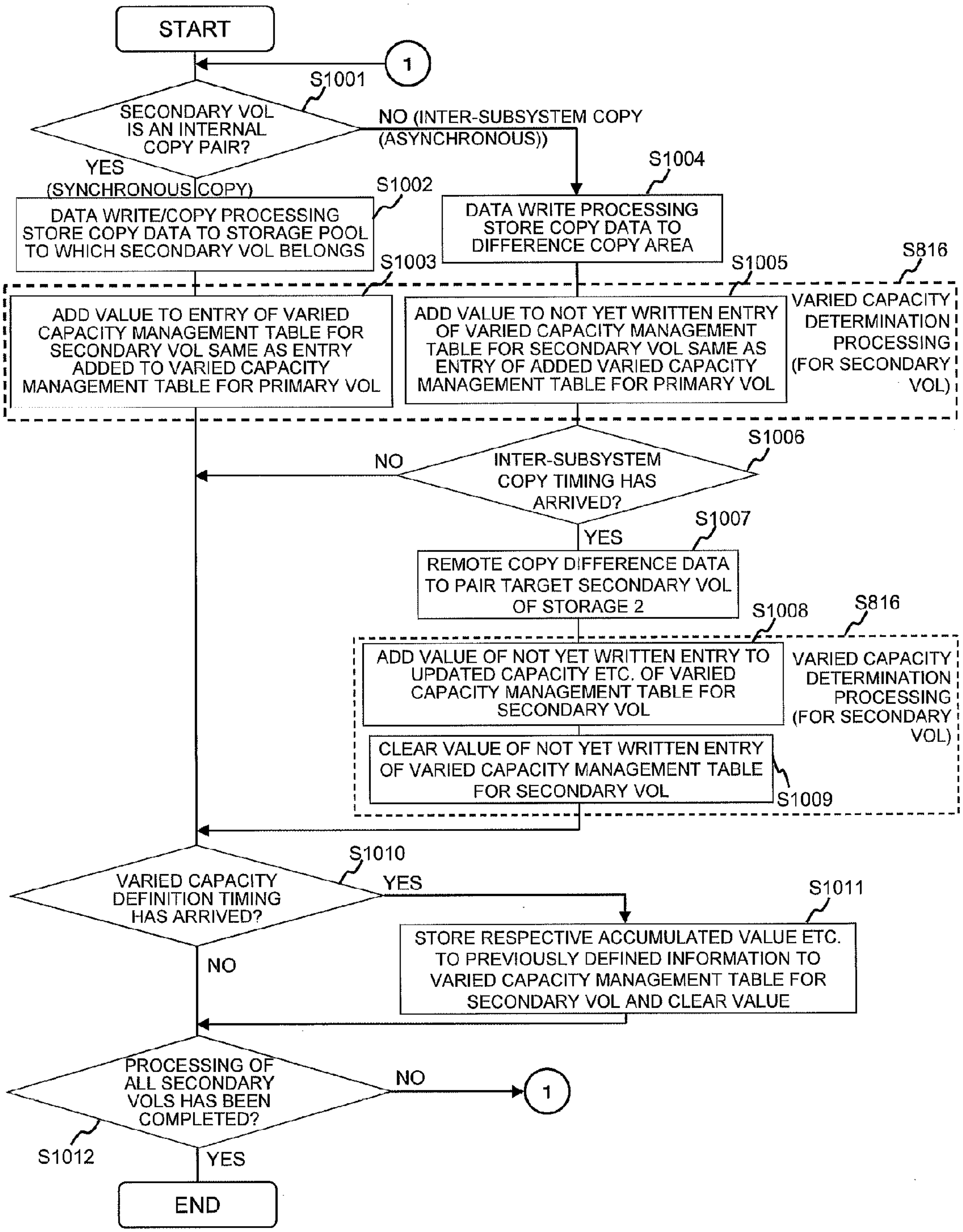
FIG. 10 is a flowchart illustrating a backup processing to a secondary VOL and varied capacity management process according to the present invention.

In S816, the primary-secondary VOL varied capacity management program 423 executes a varied capacity determination processing for secondary VOL illustrated in FIG. 10. The varied capacity management table 60 for secondary VOL is updated in this varied capacity determination processing for secondary VOL, and the varied capacity occurring in the secondary VOL can be comprehended. The details of this processing will be described with reference to FIG. 10. Further, the storage subsystem 40 executes the process of S821 and the processes of S812 through S816 for a certain period of time (for example, from the measurement start time 507 to the scheduled measurement end time 508 of FIG. 5), to update the contents of the varied capacity management table 50 for primary VOL and the varied capacity management table 60 for secondary VOL, and to manage the storage capacity.

In S803, the capacity management program 321 transmits a varied capacity report request to the corresponding primary VOL and secondary VOL to the storage subsystem 40*a*. The varied capacity report request is transmitted at a timing of completion of backup (completion of data copy), which can be transmitted periodically using a scheduler, or can be sent based on a capacity aggregate request received by the capacity management server 30 or the client terminal 20.

In S817, the primary-secondary VOL varied capacity management program 423 transmits a varied capacity report processing in response to the received varied capacity report request, and a varied capacity and a time information of the corresponding primary VOL and secondary VOL to the capacity management server 30.

In S804, the capacity management program 321 aggregates the varied capacity of the received primary VOL and secondary VOL, and displays the aggregated result together with the time information on the display unit 305 of the capacity management server 30, to notify the capacity use status to the system administrator. At this time, it is possible to request the aggregated result and the time information to be displayed on the display unit 205 of the client terminal 20, as in S805. Thereby, the user can comprehend the status of capacity use.

In performing a varied capacity management process after a certain time has elapsed from the creation of the primary VOL, the capacity of the data not yet written to the secondary VOL via inter-subsystem copy can be initialized after completing the initial synchronous copy processing. The varied capacity repot requests can be acquired periodically using a scheduler, or can be acquired based on an instruction from a user or a system administrator. The data copy processing can be executed based on a backup instruction, or the issuing of an aggregate command for capacity management, or a request to display the aggregated result. In the varied capacity determination processing for secondary VOL of S816, if the copying process is an internal copy, the result of the determination processing for primary VOL can be used.

<Varied Capacity of Primary VOL>

FIG. 9 is a flowchart illustrating a process for managing varied capacity in a primary VOL according to the present invention.

In S901, the storage subsystem 40*a* receives a write request and a write data from the client terminal 20.

In S902 (data write processing), the storage subsystem 40*a* stores write data to a storage pool to which the primary VOL being the write target belongs.

In S903, the primary-secondary VOL varied capacity management program 423 determines whether a new storage area has been allocated by the writing of data. If a new storage area has been allocated (Yes), the primary-secondary VOL varied capacity management program 423 executes S904, and if not (No), the program executes S907.

In S904, the primary-secondary VOL varied capacity management program 423 adds a capacity of a newly allocated storage area to the capacities of the used capacity 503 and the incremented capacity 504 in the varied capacity management table 50 for primary VOL.

In S905, the primary-secondary VOL varied capacity management program 423 determines whether the write data capacity is greater than the newly allocated capacity or not. If it is greater (Yes), the primary-secondary VOL varied capacity management program 423 determines that there is a need to update existing data by the write data, and executes S906. If it is not greater (No), the primary-secondary VOL varied capacity management program 423 executes S910.

In S906, the primary-secondary VOL varied capacity management program 423 adds a value having subtracted the newly allocated capacity from the write data capacity to the updated capacity 506 in the varied capacity management table 50 for primary VOL.

If a new storage area is not allocated by the data write process (S903: No), the primary-secondary VOL varied capacity management program 423 executes S907, and determines whether a write area has been released or not. If the write command is a delete command, or if the write data is all "0", the primary-secondary VOL varied capacity management program 423 determines that the write area has been released (Yes), and executes S909. If it is determined that the write area has not been released (No), the primary-secondary VOL varied capacity management program 423 executes S908.

In S908, the primary-secondary VOL varied capacity management program 423 adds a write data capacity to the value of the updated capacity 506 in the varied capacity management table 50 for primary VOL.

In S909, the primary-secondary VOL varied capacity management program 423 adds a release data capacity (capacity of 0 data write area or data delete area) to the value of the released capacity 505 in the varied capacity management table 50 for primary VOL.

The processes from S903 to S909 mentioned above correspond to the varied capacity determination processing for primary VOL of S813.

In S910, the primary-secondary VOL varied capacity management program 423 determines whether there is a secondary VOL forming a pair with the primary VOL based on the varied capacity management table 50 for primary VOL. This process is equivalent to the process of S814 mentioned earlier. If there is a secondary VOL (Yes), the primary-secondary VOL varied capacity management program 423 executes S911, and if not (No), the program executes S912.

Process S911 is a process performing data copy to the secondary VOL and determining the varied capacity thereof. The details will be described with reference to FIG. 10.

In S912, the primary-secondary VOL varied capacity management program 423 determines whether a varied capacity definition timing has arrived or not based on the scheduled measurement end time 508 of the varied capacity management table 50 for primary VOL. If the measurement end time of the scheduled measurement end time 508 is the same as the current time, the primary-secondary VOL varied capacity management program 423 determines that the varied capacity definition timing has arrived. If it is determined that the timing has arrived (Yes), the primary-secondary VOL varied capacity management program 423 executes S913, and if not (No), the program ends the process.

In S913, the primary-secondary VOL varied capacity management program 423 stores the accumulated value of the respective capacities and the time data (data from the used capacity 503 to the scheduled measurement end time 508 of FIG. 5) to the previously defined information 511 of the varied capacity management table 50 for primary VOL, and clears the respective accumulated values excluding the used capacity 503 and the respective time data.

<Varied Capacity of Secondary VOL>

FIG. 10 is a flowchart showing a backup processing performed to the secondary VOL and the varied capacity management process according to the present invention. This backup is executed at a timing of whether data is written into the primary VOL, but it can be executed periodically using a scheduler, or can be performed in response to a capacity aggregate request received by the capacity management server 30 or the client terminal 20.

In S1001, the primary-secondary VOL varied capacity management program 423 determines whether a secondary VOL forming a pair with the primary VOL exists within the subsystem or not. If the secondary VOL exists within the subsystem (Yes), the primary-secondary VOL varied capacity management program 423 causes the internal backup program 421 to execute synchronous copy. If the secondary VOL does not exist internally but exists externally (in another storage subsystem) (No), the primary-secondary VOL varied capacity management program 423 causes the inter-subsystem backup program 422 to execute asynchronous copy.

In S1002 (data write/copy processing), the internal backup program 421 stores the write data sent from the client terminal 20 to the storage pool to which the secondary VOL belongs.

In S1003, the primary-secondary VOL varied capacity management program 423 adds a numerical value to an entry of the varied capacity management table 60 for secondary VOL that is the same as the entry added to the varied capacity management table 50 for primary VOL.

In S1004 (data write processing), the inter-subsystem backup program 422 stores the write data from the client terminal 20 to the difference copy area (such as JVOL-2P 48*a* of FIG. 1). The difference data stored in the journal volume JVOL-2P 48*a* is handled as not yet written data, so that it will not be used to calculate the actual used capacity.

In S1005, the primary-secondary VOL varied capacity management program 423 adds a value to the unwritten entry of the varied capacity management table 60 for secondary VOL which is the same entry as that added to the varied capacity management table 50 for primary VOL. The processes of S1003 and S1005 and the processes of S1008 and S1009 mentioned later correspond to the varied capacity determination processing for secondary VOL according to process S816 of FIG. 8.

In S006, the primary-secondary VOL varied capacity management program 423 determines whether an inter-subsystem copy timing has arrived based on the time information set to the scheduled upcoming write time 611 of the varied capacity management table 60 for secondary VOL. If the inter-subsystem copy timing has arrived (Yes), the primary-secondary VOL varied capacity management program 423 requests the inter-subsystem backup program 422 to execute process S1007. If the timing has not arrived (No), the primary-secondary VOL varied capacity management program 423 executes S1010.

In S1007, the inter-subsystem backup program 422 copies the difference data to a pair target secondary VOL of the storage 2 (storage subsystem 40*b*) by asynchronous remote copy. At this time, the difference data is written into the secondary VOL via the journal volume (such as JVOL-2S 48*b* of FIG. 1). Since the difference data stored in the journal volume JVOL-2P 48*a* is handled as not yet written capacity, it will not be used to calculate the actual used capacity.

In S1008, the primary-secondary VOL varied capacity management program 423 adds a value of an unwritten entry to the updated capacity and the like of the varied capacity management table 60 for secondary VOL.

In S1009, after asynchronous remote copy is completed, the primary-secondary VOL varied capacity management program 423 clears the value of the unwritten entries (reference numbers 608 to 610) of the varied capacity management table 60 for secondary VOL and the scheduled upcoming write time 611.

In S1010, the primary-secondary VOL varied capacity management program 423 determines whether the varied capacity definition timing has arrived or not. If the timing has arrived (Yes), the primary-secondary VOL varied capacity management program 423 executes S1011, and if not (No), the program executes S1012.

In S1011, the primary-secondary VOL varied capacity management program 423 stores the accumulated value of the respective entries (reference numbers 604 to 607) to the previously defined information of the varied capacity management table 60 for secondary VOL, and clears the value after completing storage.

In S1012, the primary-secondary VOL varied capacity management program 423 determines whether the processes of S1001 through S1011 have been completed for all secondary VOLs or not. If a secondary VOL to be processed exists (No), the primary-secondary VOL varied capacity management program 423 repeats the processes of S1001 and thereafter. Further, if there is no secondary VOL to be processed (Yes), the primary-secondary VOL varied capacity management program 423 ends the process.

<Backup Capacity Management>

Figure 11:
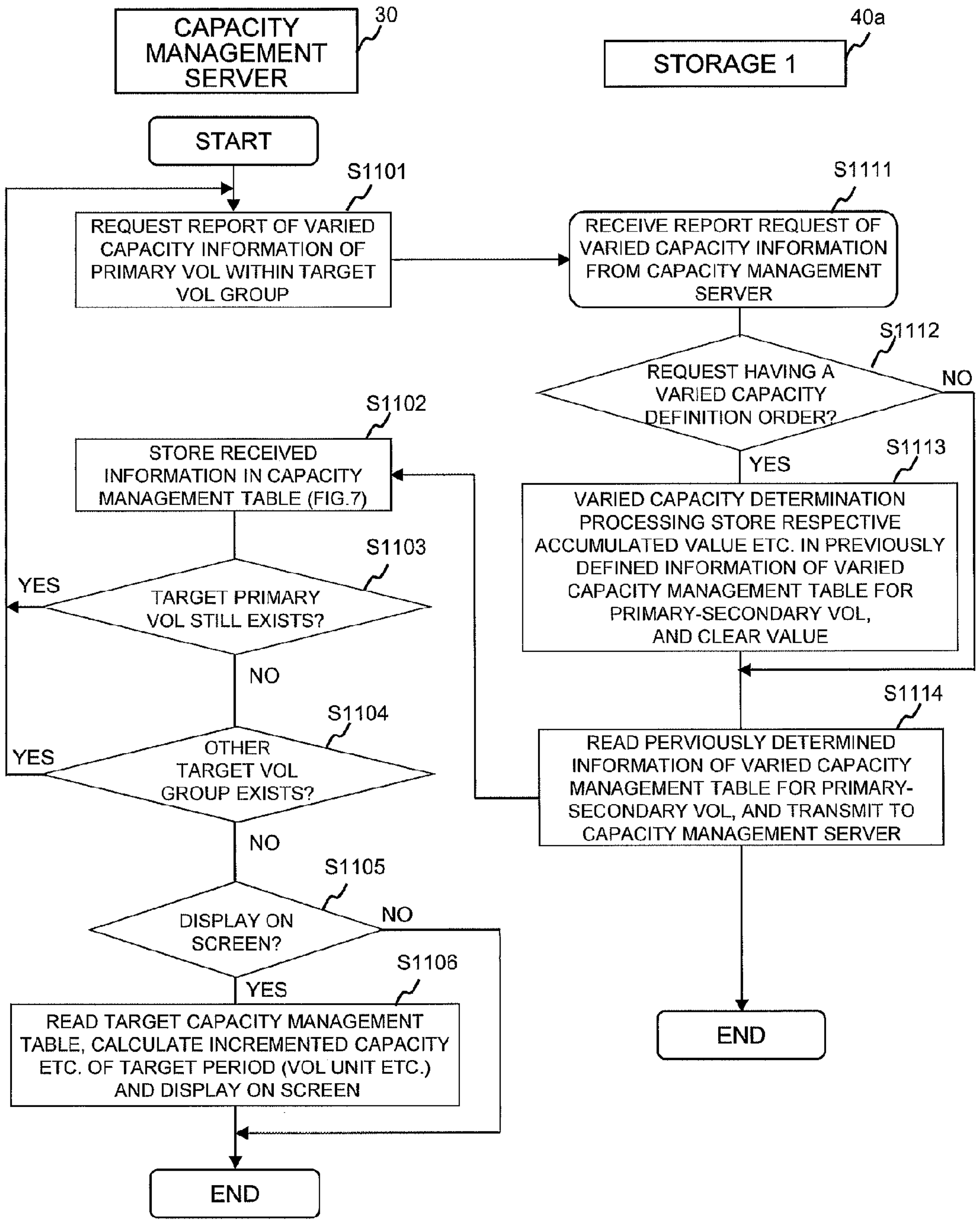
FIG. 11 is a flowchart illustrating a process for managing a backup capacity in a capacity management server according to the present invention.

FIG. 11 is a flowchart showing a process for managing a backup capacity in a capacity management server according to the present invention.

In S1101, the capacity management program 321 of the capacity management server 30 sends a report request of the varied capacity information of the primary VOL in a target VOL group acquiring the varied capacity to the storage 1 (storage subsystem 40*a*).

In S1111, the storage subsystem 40*a* receives a report request of the varied capacity information from the capacity management server 30.

In S1112, the primary-secondary VOL varied capacity management program 423 determines whether the report request has a varied capacity definition instruction or not. What is meant by "having a varied capacity definition instruction" is that a varied capacity at the current point of time (latest time) is stored in the previously defined information 511 and 612. If it has a varied capacity definition instruction (Yes), the primary-secondary VOL varied capacity management program 423 executes S1113, and if not (No), the program executes S1114.

In S1113 (varied capacity definition processing), the primary-secondary VOL varied capacity management program 423 stores the respective accumulated values and the time information in the previously defined information 511 of the varied capacity management table 50 of the primary VOL and the previously defined information 612 of the varied capacity management table 60 of the secondary VOL, and clears the values and the time information.

In S1114, the primary-secondary VOL varied capacity management program 423 reads the previously defined information 511 in the varied capacity management table 50 of the primary VOL and the previously defined information 612 of the varied capacity management table 60 of the secondary VOL, and transmits the same to the capacity management server 30.

In S1102, the capacity management program 321 stores the received information (measurement time information and capacity information of each VOL) in the capacity management table 70.

In S1103, the capacity management program 321 determines whether there is still a primary VOL being the target of acquisition of varied capacity. If there is (Yes), the capacity management program 321 repeats the processes of S1101 and thereafter. If there is no VOL (No), the capacity management program 321 executes S1104.

In S1104, the capacity management program 321 determines whether there is a different VOL group being the target. If there is (Yes), the capacity management program 321 repeats the processes of S1101 and thereafter. If there is no different VOL group (No), the capacity management program 321 executes S1105.

In S1105, the capacity management program 321 determines whether the contents of the capacity management table 70 should be displayed on the screen of the display unit 305 or not. If it should be displayed (Yes), the capacity management program 321 executes S1106, and if not (No), the program ends the process.

In S1106, the capacity management program 321 reads the capacity management table 70 of the acquisition target VOL from the memory 302, and calculates the incremented capacity of the aggregate target period in volume units. Then, the capacity management program 321 displays the calculated result on the display unit 305 and ends the process. Further, the capacity management program 321 can request the display unit 205 of the client terminal 20 to display the calculation result. Thereby, an effect of enabling the user and the system administrator to share the same information at the same time can be achieved.

Further, it is possible to have the capacity management tables 70 in VOL units to display the result of gathering information in VOL group units. Thus, it becomes possible for the user or the system administrator to comprehend the actual used storage capacity not in small units such as VOL units but in larger units such as VOL group units.

The processes of FIG. 8 to FIG. 11 enable to calculate the used capacity, the incremented capacity, the released capacity and the updated capacity within a given time of the primary VOL and the secondary VOL. Therefore, the user or the system administrator can comprehend the accurate value of the storage capacity being used in the storage subsystem together with the time information, so that in enhancing or expanding the storage system, it becomes possible to make plans corresponding to the actual system, and to perform metered rate charging based on the accurate status of use.

Further, since the latest used capacity, the incremented capacity, the released capacity and the updated capacity can be acquired based on the instruction from the user or the system administrator, it becomes possible to achieve the effect of facilitating the comprehension of capacity and improving the user-friendliness of the system. Further, since the varied capacity information can be acquired at fixed intervals as shown in FIG. 7, the information can be managed and analyzed as statistical data.

Embodiment 2

Overall Processing

Figure 12:
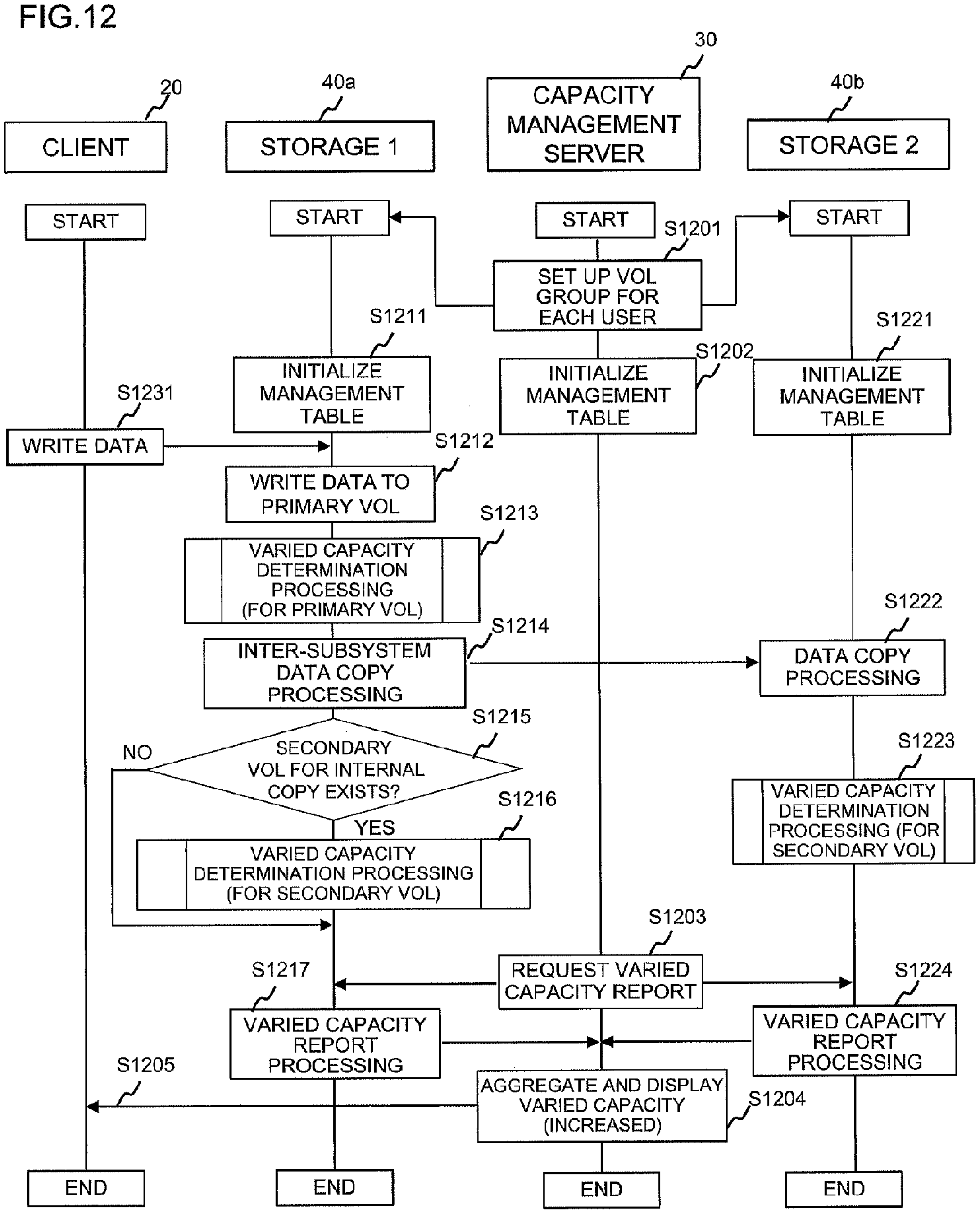
FIG. 12 is a flowchart illustrating an overall processing of varied capacity management according to a second embodiment of the present invention.

FIG. 12 is a flowchart illustrating an overall processing of varied capacity management according to a second embodiment of the present invention. The second embodiment is a method performing capacity management of a secondary VOL at the side of the inter-subsystem copy destination storage subsystem, assuming that the copy is an inter-subsystem copy.

In S1201, the capacity management server 30 sets up VOL groups for each user, and creates a primary VOL. At the same time, the capacity management server 30 requests storage 1 (storage subsystem 40*a*) and storage 2 (storage subsystem 40*b*) to initialize the varied capacity management table 50 for primary VOL and the varied capacity management table 60 for secondary VOL.

In S1202, the capacity management program 321 initializes the capacity management table 70. The varied capacity management table 50 for primary VOL and the varied capacity management table 60 for secondary VOL are initialized, respectively, by the primary-secondary VOL varied capacity management program 423 of the storage subsystem 40*a* in S1211 and the primary-secondary VOL varied capacity management program 423 of the storage subsystem 40*b* in S1221.

Process S1231 is the same as process S821 of FIG. 8, S1212 is the same as S812, and S1213 is the same as S813, so the descriptions thereof are omitted.

In S1214 (inter-subsystem data copy), inter-subsystem data copy is executed between the storage subsystem 40*a* and the storage subsystem 40*b*.

In S1222, the storage subsystem 40*b* receives copy data transmitted from the storage subsystem 40*a*.

In S1223, the primary-secondary VOL varied capacity management program 423 of the storage subsystem 40*b* executes a varied capacity determination processing for secondary VOL similar to S816, and updates the contents of the varied capacity management table 60 for secondary VOL of the storage subsystem 40*b*.

In S1215, the primary-secondary VOL varied capacity management program 423 of the storage subsystem 40*a* determines whether there is a secondary VOL to be subjected to internal copy. If there is (Yes), the primary-secondary VOL varied capacity management program 423 executes the varied capacity determination processing for secondary VOL of S1216. The varied capacity determination processing for secondary VOL of S1216 is the same as process S816, so detailed descriptions thereof will be omitted.

In S1203, the capacity management program 321 of the capacity management server 30 transmits a report request of varied capacity to the storage subsystem 40*a* and the storage subsystem 40*b*.

In S1217, the primary-secondary VOL varied capacity management program 423 of the storage subsystem 40*a* executes a varied capacity report processing, that is, transmits the contents of the previously defined information of the varied capacity management table 50 for primary VOL and the varied capacity management table 60 for secondary VOL in the storage subsystem 40*a* to the capacity management server 30.

In S1224, similar to S1217, the primary-secondary VOL varied capacity management program 423 of the storage subsystem 40*b* transmits the contents of the previously defined information of the varied capacity management table 50 for primary VOL and the varied capacity management table 60 for secondary VOL in the storage subsystem 40*a* to the capacity management server 30.

In S1204, the capacity management program 321 aggregates the received varied capacity of primary VOL and secondary VOL, and displays the aggregated result together with the time information on the display unit 305 of the capacity management server 30, to thereby notify the status of use of capacity to the system administrator. At this time, as shown in S1205, it is possible to request the aggregated result and the time information on the display unit 205 of the client terminal 20. Thereby, the user can comprehend the status of use of capacity.

Embodiment 2 illustrates an example where a single capacity management server gathers information from the respective storage subsystems, but it is possible to couple capacity management servers to each storage subsystem and perform capacity management of the respective VOLs (primary VOL and secondary VOL).

Further, a primary VOL can be created in storage 2 (storage subsystem 40*b*) and a secondary VOL can be created in storage 1 (storage subsystem 40*a*) to form a pair. Similar to embodiment 1, the processing of the primary VOL is performed in FIG. 7 and the processing of the secondary VOL is performed in FIG. 8.

As described, similarly in embodiment 2 as embodiment 1, the used capacity, the incremented capacity, the released capacity and the updated capacity within a given period of time of the primary VOL and the secondary VOL can be comprehended both in the storage subsystem 40*a* and the storage subsystem 40*b*. Therefore, a similar effect can be achieved according to embodiment 2 as embodiment 1.

The present invention is not restricted to the above-illustrated preferred embodiments, and can include various modifications. The above-illustrated embodiments are mere examples for illustrating the present invention in detail, and they are not intended to restrict the present invention in any way to include all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations.

A portion or whole of the above-illustrated configurations, functions, processing units, processing means and so on can be realized via hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk or an SSD (Solid State Drive), or in a memory media such as an IC card, an SD card or a DVD.

Only the control lines and information lines considered necessary for description are illustrated in the drawings, and not necessarily all the control lines and information lines required for production are illustrated. In actual application, it can be considered that almost all the components are mutually coupled.

REFERENCE SIGNS LIST

1, 2 Data center
10 Storage system
20 Client terminal
30 Capacity management server
40*a*, 40*b* Storage subsystem
42 Primary VOL 1
43 Secondary VOL 1
44 Synchronous copy
45 Primary VOL 2
46 Secondary VOL 2
47 Asynchronous copy
48*a*, 48*b* Journal volume
50 Varied capacity management table for primary VOL
60 Varied capacity management table for secondary VOL
70 Capacity management table
201, 301, 401 CPU
203, 303 Built-in HDD
205, 305 Display unit
206, 306 Input unit
307 Capacity management program
421 Internal backup program
422 Inter-subsystem backup program
423 Primary-secondary VOL varied capacity management program

The invention claimed is:

1. A storage system coupled to a client terminal comprising:

a first storage subsystem;

a second storage subsystem; and a management server device configured to manage a plurality of storage subsystems that includes the first storage subsystem and the second storage subsystem, wherein the management server device includes:

a management CPU; and a communication interface communicatively coupled with the first storage subsystem and the second storage subsystem via a network;

wherein the first storage subsystem includes:

a first storage CPU;

a first storage memory configured to store device information and data from the client terminal;

a first storage communication interface communicatively coupling the first storage subsystem to another storage subsystem and the management server device via the network;

a first plurality of storage devices configured to store data from the client terminal;

a first primary volume composed of a storage area in the first plurality of storage devices and a first secondary volume forming a pair with the first primary volume to have data copied from the first primary volume for backup; and a second primary volume;

wherein the first storage CPU is configured to:

determine whether an I/O access from the client terminal to the first primary volume is any one of the following: addition of new data, update of existing data, or deleting of existing data;

store to a first storage memory of the storage subsystem an added storage capacity when the new data is added, an updated storage capacity when the existing data is updated, or a released storage capacity when the existing data is deleted, respectively;

update an actual used storage capacity of the first primary volume stored in the first storage memory of the first storage subsystem based on the added storage capacity and the released storage capacity;

determine whether an I/O access from the client terminal to the respective primary volumes is any one of the following: addition of new data, update of existing data, or deleting of existing data; and stores each of an added storage capacity, an updated storage capacity, or a released storage capacity in the first storage memory of the first storage subsystem;

update an actual used storage capacity of the second primary volume stored in the first storage memory based on the added storage capacity and the released storage capacity of the second primary volume;

store information on the storage capacity written to the first secondary volume and information on a storage capacity not yet written thereto in a backup copying process performed to match contents of the first primary volume and the first secondary volume to the first storage memory; and update the actual used storage capacity of the first secondary volume stored in the first storage memory based on the added storage capacity and the released storage capacity reflected in the first secondary volume; and wherein the second storage subsystem includes:

a second storage CPU;

a second storage memory configured to store device information and data from the client terminal;

a second plurality of storage devices for storing backup data from the first storage subsystem;

a second storage communication interface communicatively coupling the second storage subsystem to another storage subsystem and the management server device via the network;

a second secondary volume and a third secondary volume composed of a storage area in the second plurality of storage devices;

the second secondary volume forming a pair with the first primary volume and performing backup of the content of the first primary volume; and the third secondary volume forming a pair with the second primary volume and performing backup of the content of the second primary volume; and wherein the management server device is configured to acquire acquired storage capacity information of the respective storage capacities.

2. The storage system according to claim 1, wherein an information on a storage capacity having contents written to the secondary volume and information on a storage capacity not yet written thereto in a backup copying process performed to match the contents of the respective primary volumes and the respective secondary volumes forming a pair therewith are stored in the storage memory of the respective storage subsystems;

an actual used storage capacity of the respective secondary volumes stored in the storage memory of the respective storage subsystems is updated by the added storage capacity and the released storage capacity having data reflected thereto; and the management server device acquires information on the respective storage capacities of the primary volumes and secondary volumes forming a pair therewith from the respective storage subsystems.

3. The storage system according to claim 2, wherein an I/O access to the respective primary volumes is measured to obtain acquired measurement time information for a given time, and the management server device acquires respective storage capacity information of the respective primary volumes and respective secondary volumes forming a pair therewith and the acquired measurement time information.

4. The storage system according to claim 3, wherein the management server device acquires the storage capacity information and the measurement time information from the respective storage subsystems when the backup copying process is completed.

5. The storage system according to claim 4, wherein the management server device comprises an input unit for receiving an acquisition request of the storage capacity information, and acquires the storage capacity information and the measurement time information from the respective storage subsystems when the acquisition request entered through the input unit is received or when the acquisition request is issued within the management server device.

6. The storage system according to claim 5, wherein the management server device aggregates the storage capacity information and the measurement time information acquired from the respective storage subsystems for each secondary volume forming a pair with the respective primary volumes.

7. The storage system according to claim 6, wherein the management server device comprises a display unit for displaying the storage capacity; and the CPU of the management server device displays the acquired storage capacity information and the measurement time information on the display unit.

8. The storage system according to claim 5, wherein based on an acquisition request of storage capacity information from the client terminal, the client terminal or the management server device acquires the storage capacity information and the measurement time information from the respective storage subsystems.

9. The storage system according to claim 5, wherein the CPU of the management server device determines whether the acquisition request includes a definition instruction to define the storage capacity information;

if there is the definition instruction, acquires the storage capacity information and the measurement time information at the time of the acquisition request; and if there is no determination instruction, acquires the storage capacity information and the measurement time information at a time of completion of measurement.

* * * * *